United States Patent [19]

Malani et al.

[11] 4,446,172
[45] May 1, 1984

[54] METHOD OF FORMING A HIGH PERFORMANCE REFLECTIVE FILM ON A GLASS SHEET

[75] Inventors: Narayandas Malani, Grosse Ile; Thomas E. Boller, Southfield, both of Mich.

[73] Assignee: Ford Motor Company, Dearborn, Mich.

[21] Appl. No.: 491,146

[22] Filed: May 4, 1983

[51] Int. Cl.³ .......................................... C03C 17/245
[52] U.S. Cl. .................................... 427/160; 427/168
[58] Field of Search .............................. 427/160, 168

[56] References Cited

U.S. PATENT DOCUMENTS

| | | | |
|---|---|---|---|
| 3,984,591 | 10/1976 | Plumat et al. | 427/160 X |
| 4,374,156 | 2/1983 | Vong | 427/160 X |
| 4,393,098 | 7/1983 | Stinson et al. | 427/160 X |
| 4,397,671 | 8/1983 | Vong | 427/168 X |

Primary Examiner—James R. Hoffman
Attorney, Agent, or Firm—William E. Johnson; Olin B. Johnson

[57] ABSTRACT

This specification discloses a method of forming a high performance reflective film on a glass sheet. The glass sheet is one which is at a temperature sufficiently high to pyrolyze an organic based, metal containing glass coating composition coming into contact therewith. An organic based, heated pyrolyzable, dual metal containing glass coating composition is directed against a surface of the heated glass sheet. The dual metals in this coating composition are cobalt and iron. The dual metals are present in the coating composition by weight percentage of dual metals in a range from 97% cobalt/3% iron to 90% cobalt/10% iron, preferably 96% cobalt/4% iron to 92% cobalt/8% iron, and most preferably 95% cobalt/5% iron to 93% cobalt/7% iron.

6 Claims, 1 Drawing Figure

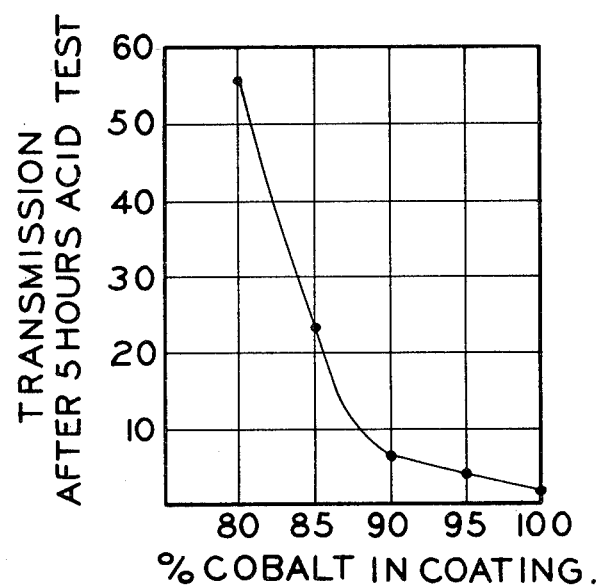

METHOD OF FORMING A HIGH PERFORMANCE REFLECTIVE FILM ON A GLASS SHEET

TECHNICAL FIELD

This specification is directed to a method of forming a film on a glass sheet in which the glass sheet is heated to a temperature sufficiently high to pyrolyze an organic based, metal containing glass coating composition which comes into contact therewith.

BACKGROUND ART AND PRIOR ART STATEMENT

No search was conducted on the method of forming a high performance reflective film on a glass sheet in the U.S. Patent and Trademark Office or in any other search facility.

We are aware of prior work, which has been done by our associates at Ford Motor Company, developing powdered, organic based, metal containing glass coating compositions which are heat pyrolyzable to form a film on a heated glass sheet.

In U.S. application Ser. No. 434,642, now U.S. Pat. No. 4,393,098, filed Sept. 20, 1982, as a continuation-in-part of earlier filed U.S. application Ser. No. 325,891, filed Nov. 30, 1981, now abandoned, our associates disclosed a method of placing a metal oxide film on a surface of a heated glass sheet. In that particular application, a powder was disclosed which was made up of 76% by weight cobalt acetylacetonate, 12% by weight iron acetylacetonate, and 12% by weight chromium acetylacetonate. The patent application goes on to describe, in detail, the manner in which that powder is applied to a heated glass surface in order to develop a film on the glass sheet.

In U.S. application Ser. No. 425,195, now U.S. Pat. No. 4,397,671 filed July 29, 1982, also assigned to Ford Motor Company, our associates disclosed still another process for developing a coating film on a heated glass sheet. In this application our associates disclosed a method of preparing a special powder spray composition which comprised a plurality of hollow, generally spherical particles which are used as the spray composition for spraying against a heated glass sheet. In this disclosure the particular composition disclosed for developing the spherical particles was an initial powder mixture which consisted of about 70% by weight cobalt acetylacetonate, 18% by weight iron acetylacetonate, and 12% by weight chromium acetylacetonate.

We are also aware that Ford Motor Company uses organo metallic materials dissolved in a suitable solvent such as methylene chloride for application to the surface of a heated glass sheet in order to develop a film on the glass sheet. In the solution sprays used by Ford Motor Company there is approximately, by weight percent, 12.5% by weight solids and 87.5% by weight of solvent. The solid composition is generally made up of cobalt acetylacetonate in a range from 66.5–68.5% by weight, chromium acetylacetonate 12–14% by weight, with the balance being iron acetylacetonate in a range generally from 18.5–20.5% by weight.

The one thing that did not result from the application of the coating compositions set forth above is a true high performance reflective glass film on a glass sheet. By a high performance reflective glass film we mean one that has a "shading coefficient" of 0.40 or less. A shading coefficient is defined in the architectural glass business as the ratio of the solar heat gain for any given glass to the solar heat gain under the same conditions for ⅛ inch clear glass.

It is well known that architects today use vast amounts of glass for enclosing large buildings such as commercial office buildings and hotels. It is essential that glass used in such structures generally have a high performance reflective film thereon which is effective in reflecting solar energy so that reflected energy does not enter the building's interior. This is particularly true in areas such as the "sun belt" areas of the United States.

It is therefore a principal object of the method of this invention to provide a method for forming a high performance reflective film on a glass sheet, the high performance reflective film having a shading coefficient of 0.40 or less (based upon a ⅛ inch thick clear glass sample having a shading coefficient of 1.0).

DISCLOSURE OF THE INVENTION

This invention is directed to a method of forming a high performance reflective film on a glass sheet and, more particularly, to a method of forming a high performance reflective film on a glass sheet in which the glass sheet is at a temperature sufficiently high to pyrolyze an organic based, metal containing glass coating composition coming into contact therewith. The method of our invention is characterized by the step of directing against a surface of the heated glass sheet an organic based, heat pyrolyzable, dual metal containing glass coating composition. The dual metals contained in the dual metal containing glass coating composition are cobalt and iron. The dual metals are in a weight percentage relationship of total metals with one another in a range from 97% cobalt-3% iron to 90% cobalt-10% iron. This range is preferably one which extends from 96% cobalt-4% iron to 92% cobalt-8% iron, and most preferably is in a range from 95% cobalt-5% iron to 93% cobalt-7% iron.

The organic based, heat pyrolyzable, dual metal containing glass coating composition can be applied to the glass sheet as either a solution or as a powder. If applied as a solution, generally about 12–13% by weight of the organic based, heat pyrolyzable, dual metal containing glass coating composition is dissolved in 88–87% by weight of a suitable solvent such as methylene chloride. Normally, the metals are in the form of an acetyl acetonate compound. If the organic based, heat pyrolyzable, dual metal containing glass composition is applied as a powder, it may be applied as taught in the patent applications cited earlier herein, which are also assigned to Ford Motor Company.

The method of our invention is best practiced at the exit end of a flat glass manufacturing process, such as the float process, wherein the virgin ribbon is emerging from its manufacturing process in a heated condition. The method may also be practiced by reheating previously annealed glass to a temperature sufficiently high to pyrolyze an organic based, metal containing glass coating composition which comes into contact therewith.

BRIEF DESCRIPTION OF THE DRAWING

The novel features that are considered characteristic of the invention are set forth with particularity in the appended claims. The invention itself, however, both as to its organization and its method of operation, together with additional objects and advantages thereof, will best be understood from the following description of specific embodiments when read in conjunction with the accompanying drawing, wherein the FIGURE is a graphical presentation of data regarding the change in percent transmission through a glass sample after a five hour acid test plotted against the percent cobalt of the total metals in the dual metal containing glass coating composition.

BEST MODE AND INDUSTRIAL APPLICABILITY

The following description is what we consider to be a preferred embodiment of our method of forming a high performance reflective film on a glass sheet. The following description also sets forth what we now contemplate to be the best mode of carrying out the method of this invention. This description is not intended to be a limitation upon the broader principles of this method; and, while preferred materials are used to illustrate the method in accordance with the requirements of the patent laws, it does not mean that the method is operative only with the stated materials, unless that is explicitly stated in the specification.

It is well known that certain organic based, metal containing glass coating compositions will pyrolyze when directed against the surface of a glass sheet heated to a temperature sufficiently high to cause the pyrolysis thereof. When pyrolyzed, the organic portion of the coating composition is burned away and the metallic component thereof deposits as an oxide of the metal on the glass surface and becomes physically bonded to the surface to form a reflective film thereon.

The organic based, metal containing glass coating composition may be applied to a glass sheet in one of two ways: it may be sprayed on the glass sheet as a solution (that is, dissolved in a suitable solvent), or it may be applied to a glass sheet as a powder material. Normally, the organic base for the metal containing glass coating composition is acetylacetonate. A metal acetylacetonate is easy to prepare and is readily pyrolyzed when directed against a surface of a glass sheet heated to a sufficiently high temperature. When a solution is used for the spraying operation, the normal solvent used for acetylacetonate salts is methylene chloride. Normally, approximately 12–13% by weight of a glass coating composition will be dissolved in 88–87% by weight of the suitable solvent.

As stated above, our associates at Ford Motor Company were spraying, either by solvent spray or by powder spray, organic based, metal containing glass coating compositions in which three metals were generally used. These metals included cobalt, chromium, and iron. When these materials were applied to a body colored glass (that is, a glass having a green or bronze body color thereto, as compared to a clear, noncolored glass), the resulting product was one that had a reflective film thereon, but the reflective film was not a high performance reflective film as classified by the shading coefficient obtained when the glass was used. By a high performance reflective film we mean a film which when applied to a body colored glass will result in a shading coefficient of 0.40 or less. We, therefore, were looking to develop a method of forming a high performance reflective film.

We found that such a high performance film could be made if an organic based, heat pyrolyzable, dual metal containing glass coating composition, to be described hereinbelow, was directed against a surface of a heated glass sheet. The dual metal containing glass coating composition which we found to be effective with our method was one which contained as the dual metals cobalt and iron only. We found that the weight percentages of the dual metals, based on the weight of total metals, had to be in a range from 97% cobalt/3% iron to 90% cobalt/10% iron, preferably 96% cobalt/4% iron to 92% cobalt/8% iron, and most preferably 95% cobalt/5% iron to 93% cobalt/3% iron.

This coating composition differs from the previously known coating compositions described above in that the coating composition contains no chromium. Normally, chrome is necessary to give good durability as measured by a hydrochloric acid test. Surprisingly, however, the coating composition used with the method of our invention is one which produces extremely durable coating films, as measured by the hydrochloric acid durability test. The shading coefficient is improved remarkably over that obtained with the prior known composition by the fact that a high amount of cobalt is used in the film. We did not anticipate that this high amount of cobalt in the film would in fact produce such an excellent increase in shading coefficient properties over that achieved when the three component filming material was used which contained lower amounts of cobalt. We were also surprised that the low amount of iron contained in the film, as compared to previously known compositions, still was an amount sufficient so that the iron provided a very smooth film.

Once again, according to the method of our invention, the dual metal containing glass coating composition used with the method of our invention can be applied either in a solution or as a powder, as is already known in the art. The method may be carried out on glass emerging from its manufacturing process or upon glass which has been annealed and subsequently reheated to the temperature necessary to cause a pyrolysis of the glass coating composition.

One way of testing the chemical durability of a reflective film on a glass sheet is by a procedure in which a coated sample is subjected to a five hour hydrochloric acid vapor test. In this case, hydrochloric acid vapor surrounded the material and attempted to attack the coating on the glass. An attack of the coating changes the level of transmission of visual wavelength energy through the glass. There is a greater amount of energy transmitted as the film is attacked. The change in percent of transmission characteristics of the coated glass to a transmission energy therethrough is considered acceptable if it is a change in a range of 15% or less after five hours, any greater change of the film transmission being considered unacceptable.

In the drawing we have graphed the percent of change in transmission after the five hour acid test versus the percent cobalt in the cobalt/iron mixture for spray compositions. This graphical presentation shows the rather rapid failure of the film in the acid test once less than 90% cobalt is used in the spray composition. For example, when a mixture of 80% cobalt/20% iron is used, the change in percent transmission is 56% higher after the acid test than prior to the acid test, this indicating that substantially the entire filmed surface had been removed by the acid. On the other hand, the 95% cobalt/5% iron coating material had a change in percent of transmission of a remarkable 3% after the five hour acid test. Such a dramatic improvement in chemical durability by coating compositions having in excess of about 90% cobalt was totally unexpected.

Once again, we reiterate that the cobalt/iron glass coating composition disclosed hereinabove is usable for either solution spraying or powder spraying of heated glass sheets or heated virgin glass ribbon exiting from a glass forming process, in order to develop the high performance reflective film thereon. Normally the glass being treated is a body colored glass; that is, a glass having color in itself such as a green, bronze, or grey color. Generally the temperature of application is in the range from about 700°–1200° F.

While particular embodiments of the invention have been illustrated and described, it will be obvious to those skilled in the art that various changes and modifications may be made without departing from the invention, and it is intended to cover in the appended claims all such modifications and equivalents as fall within the true spirit and scope of this invention.

We claim:

1. A method of forming a high performance reflective film on a glass sheet, said glass sheet being at a temperature sufficiently high to pyrolyze an organic based, metal containing glass coating composition coming into contact therewith, said method being characterized by the step of:
    directing against a surface of said heated glass sheet an organic based, heat pyrolyzable, dual metal containing glass coating composition in which said dual metals are cobalt and iron, and in which said weight percentage of said dual metals are in a range from 97% cobalt/3% iron to 90% cobalt/10% iron.

2. The method of claim 1, in which said weight percentage of said dual metals are in a range from 96% cobalt/4% iron to 92% cobalt/8% iron.

3. The method of claim 1, in which said dual metals are in a range by weight percent of 95% cobalt/5% iron to 93% cobalt/7% iron.

4. A method of forming a high performance reflective film on a glass sheet, characterized by the steps of:
    selecting a glass sheet upon which said high performance reflective film is to be formed;
    heating said selected glass sheet to a temperature sufficiently high to pyrolyze an organic based, metal containing glass coating composition coming into contact therewith; and
    directing against a surface of said heated glass sheet an organic based, heated pyrolyzable, dual metal containing glass coating composition in which said dual metals are cobalt and iron and in which said weight percentage of said dual metals are in a range from 97% cobalt/3% iron to 90% cobalt/10% iron.

5. The method of claim 4, in which said weight percentage of said dual metals are in a range from 96% cobalt/4% iron to 92% cobalt/8% iron.

6. The method of claim 4, in which said dual metals in a range by weight percent of 95% cobalt/5% iron to 93% cobalt/7% iron.

* * * * *